May 20, 1947.  H. J. LOOK  2,420,711
GAGE FOR MEASURING THE WALL THICKNESS OF ANNULAR BEARING MEMBERS
Filed May 1, 1944  3 Sheets-Sheet 1

INVENTOR.
HENRY J. LOOK
BY
Whittemore Hulbert & Belknap
ATTORNEYS

INVENTOR.
HENRY J. LOOK

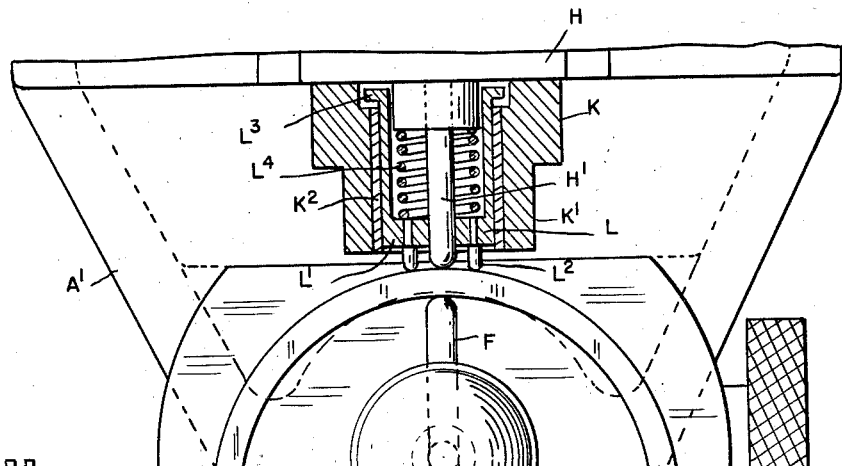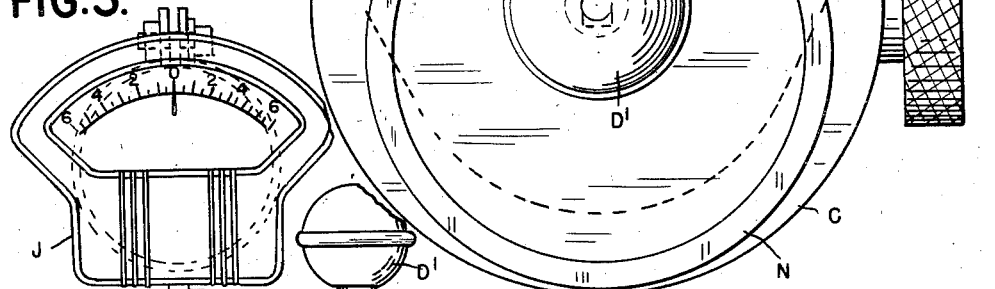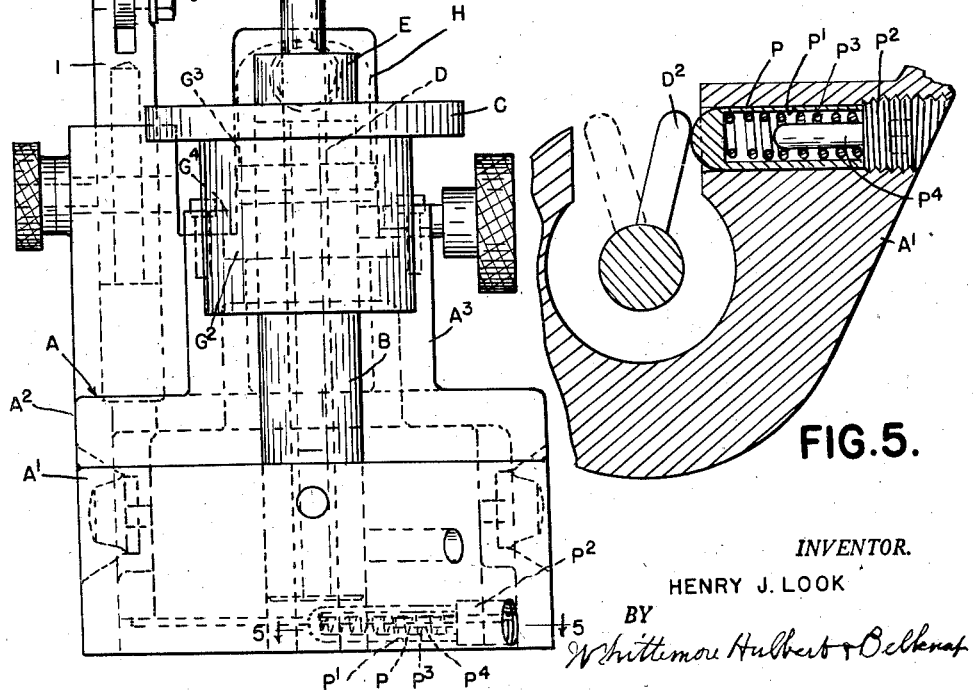

Patented May 20, 1947

2,420,711

UNITED STATES PATENT OFFICE 2,420,711

GAGE FOR MEASURING THE WALL THICKNESS OF ANNULAR BEARING MEMBERS

Henry J. Look, Detroit, Mich., assignor to Bohn Aluminum & Brass Corporation, Detroit, Mich., a corporation of Michigan Application May 1, 1944, Serial No. 533,555

7 Claims. (Cl. 33—147)

The invention relates to gages or instruments designed for measuring minute variations in dimensions. It is the object of the instant invention to obtain a construction which is more particularly designed for use in measuring the wall thickness of annular bearing members or similar structures. It is a further object to obtain a construction capable of rapid manipulation in the measurement of successive bearings and which will indicate the exact amount of deviation from the standard size in dimensions as minute as .00005 of an inch. With these objects in view, the invention consists in the construction as hereinafter set forth.

In the drawings:

Figure 3 is an end elevation.

Figure 4 is a full size horizontal section on line 4—4 of Figure 1.

Figure 5 is a horizontal section on line 5—5 of Figure 3.

Figure 1:
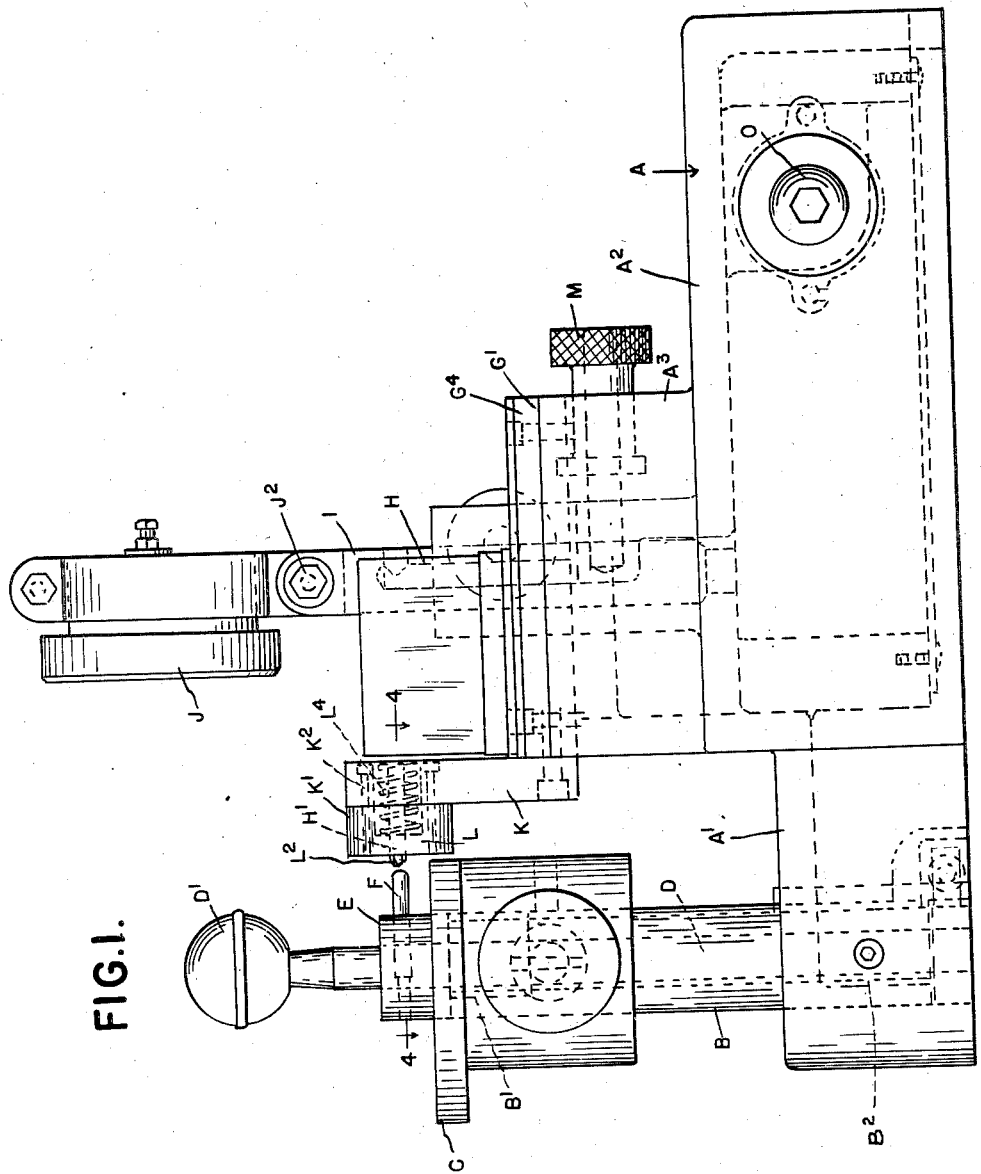
Figure 1 is a side elevation of my measuring instrument.
Figure 2:
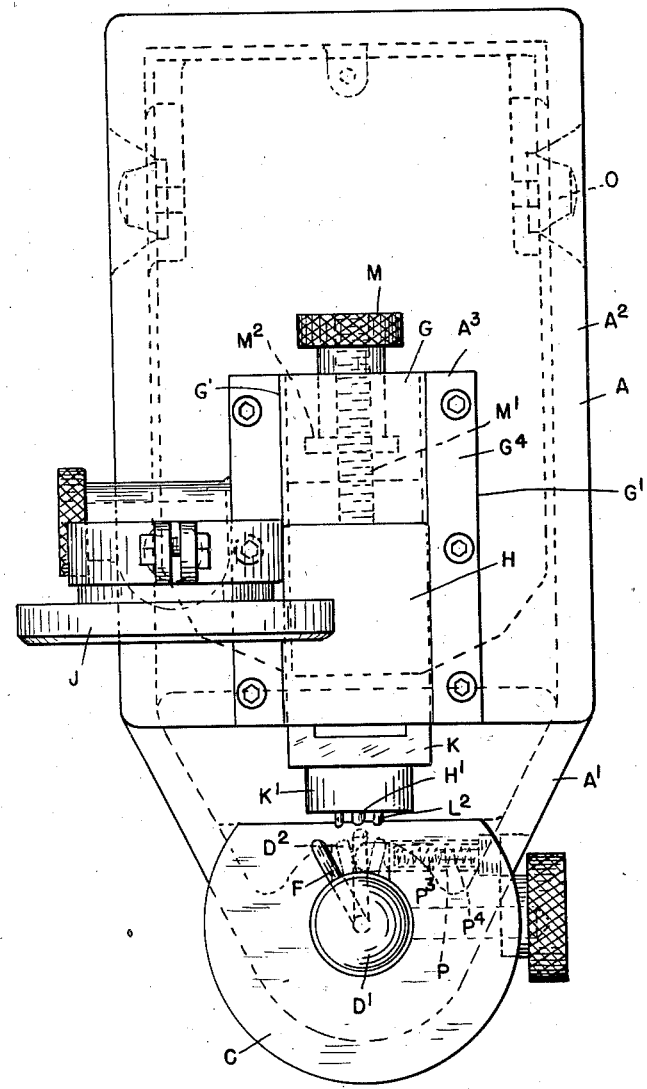
Figure 2 is a plan view thereof.

My improved measuring instrument is used in cooperation with an electro-magnetic gage or comparator, which instrument is operated by microscopic displacements of an actuating member indicated on a scale with calibrations of the order of .00005 of an inch. The construction of this electric gage or indicator is not the subject matter of the instant invention, which latter relates to the means for presenting the work in operative relation to said gage.

As illustrated, A is a bed or frame member preferably formed of cast metal having an end portion A', a slightly raised portion $A^2$ in rear thereof, and an upwardly extending portion $A^3$ on the portion $A^2$. Mounted in the portion A' is an upwardly extending hollow post member B on which is vertically adjustably mounted a table member C on which the work is supported. Within the hollow post B is a rock shaft D which is journalled in bushings B' and $B^2$ respectively at the upper and lower ends of said post. These bushings form an exact fit about the shaft holding it from any lateral displacement. On the shaft D is a collar E which is directly above the upper end of the post B and has a shouldered engagement therewith permitting a limited relative angular or rocking movement. A radius arm or finger F is mounted in the collar E and shaft D to project laterally outward therefrom. A knob D' at the upper end of the shaft D forms a hand-hold for manually rocking the shaft.

The portion $A^3$ of the base has formed thereon, guideways G' for a slide or carriage G. This slide has a lower portion $G^2$ fitting between the guideways G' and an upwardly extending portion $G^3$ of lesser width on which one element H of the electric gage is mounted. Complementary guide members $G^4$ overlap the portion $G^2$ and hold the slide against any movement other than a longitudinal movement in the guideways. The member H is a casing having arranged within the same portions of the electromagnetic mechanism, (not shown) which includes an actuating member H' in the form of a rod projecting outward from said casing. This is so positioned as to be in the same plane as the finger F and has its axis directed to intersect with the axis of the shaft D. Thus when the shaft D is rocked by the knob D' it will swing the finger F through an arc which in one position will place said finger and the rod H' in axial alignment.

Extending upward from the base at one side of the portion $A^2$ is a post I on which is mounted the indicator casing J. This is attached to the post by a knuckle joint so as to permit of tilting it to the most convenient angle for inspection by the operator during the testing operation. A clamping screw J' holds the casing in this adjusted position. The gage has an arcuate scale which is calibrated in ten thousandths of an inch with a zero marking at the center. An index pointer is moved over the scale in one direction or the other by a displacement of the member H'.

The carriage G has projecting upward therefrom, an arm K which at its upper end has a cylindrical portion K' surrounding and concentric with the rod H'. In this cylinder K' is a bushing $K^2$ which slidably supports a cup-shaped member L. The forward end L' of the member L is apertured for the passage of the rod H' and upon opposite sides of this aperture are stop bearings $L^2$ preferably formed by round headed pins. The rear end of the member L has a flange $L^3$ adapted to engage the rear end of the bushing $K^2$ to limit forward movement of said member. A helical spring $L^4$ within the cup bears with its forward end against the end L' and at its rear end abuts against the casing H. Thus, the member L is normally held at the forward limit of its sliding movement. For adjusting the slide or carriage G a thumb-nut M engages a threaded stud M' projecting rearwardly from the portion $A^3$ and an annular flange $M^2$ on the member M fits a recess in the under side of the slide G. Thus, by turning the nut M the position of the slide and all the parts mounted thereon may be adjusted in relation to the post B.

Operation

In the operation of testing a bearing or other annular member for wall thickness, this member is first placed upon the table C to surround the shaft D, collar E and finger F, the latter being in position out of alinement with the rod H'. The shaft D is then turned by the knob D' to move the finger F into alignment with said rod H' which will first bring it into contact with the inner surface of the annular member. This will move said member so as to press the outer surface against the bearings L² which will effect the centering of said member in alignment with the axis of the rod H'. A further movement of the finger F will move the annular member and the member L rearward against the resistance of the spring L⁴. This will bring the outer surface of said annular member into contact with the end of the rod H and still further movement will displace the member H indicating the amount of displacement on the gage J. However, before any test or measurement can be made it is necessary to first set the machine so that a member to be tested which is of exact size will register zero on the gage, which setting is accomplished as follows:

It is first necessary to provide a master annular member N which is of the exact dimensions including wall thickness which is desired in the work to be tested. The slide G is then retracted by adjustment of the nut M so as to provide clearance between the finger F and rod H' when in alignment for the insertion of the master member N therebetween. The slide or carriage is then adjusted forward to press both of the members L² into contact with the outer surface of the member N, thereby centering this member while further movement of the carriage will compress the spring L⁴ and bring the rod H into contact with said outer surface. It would be difficult or impossible to adjust the slide so delicately as to bring the member H into contact without any displacement of the gage index pointer. There is, however, provision in the electrical equipment for adjusting the gage to zero and this means is actuated by a knob O mounted on one side of the base A. Thus, after the manual adjustment of the carriage has been made as exactly as possible the knob O is adjusted to place the pointer at zero. This completes the setting of the device after which the master member is removed, this permitting the pointer of the indicator to move to one end of the scale. The annular members to be tested are then successively placed on the table, the finger F being normally in retracted position so as to give clearance between the same and the bearings L² on the member L. The knob is then turned to align the finger F with the rod H' which, as above described, will first center the member being tested and then move it towards and into contact with the rod H. If the wall thickness of the member tested is under size, the displacement of the member H' will not be sufficient to bring the index pointer to the zero point and the position which it attains will indicate on the scale the exact amount the tested member is under size. On the other hand, if the member tested is over size, the rod H' will be displaced to carry the index pointer beyond the zero point over the scale on the opposite side on which the amount that the bearing is over size will be indicated.

To insure the accuracy of measurement, it is necessary that the rotation of the shaft D should stop at the exact point in which the finger F is in alignment with the rods H'. For this purpose I preferably provide a finger D² on the portion of the shaft D which projects below the post B. This finger extends radially into the path of a hollow cylindrical member P which is inserted in a lateral bore P' in the portion A' of the bed A. A stop member P² threadedly engaging the bore P' is adjustable therein to limit the outward movement of the member P, while a spring P³ within the hollow member P surrounding a pintle P⁴ on the stop P² will normally move the finger D² to retract the finger F. The stop member P² may thus be so adjusted that when the shaft D is turned by the knob D' in a direction to move the finger F into alignment with the rod H', movement will be arrested when exact alignment is attained. Thus, this finger acts as a camming device for moving the member being tested so that its inner face is in an exact position on the table.

What I claim as my invention is:

1. An instrument for measuring wall thickness of concavo-convex arcuate members comprising an electromagnetic gage having an actuator and an indicator, a member yieldable in the direction of movement of said actuator provided with bearings equispaced on opposite sides thereof against which bearings one face of said arcuate member may be placed to center the same with respect to said actuator, camming means for contacting with the opposite face of said arcuate member intermediate said bearings to move the same to a predetermined position, and means for relatively adjusting said gage and camming means.

2. An instrument for measuring deviations in wall thickness of concavo-convex arcuate or annular members from a predetermined standard dimension; comprising a supporting frame, an electromagnetic gage mounted thereon including an actuator, an indicator, and zero setting means, a table on which said annular members including a master member may be successively placed, camming means for engaging the one surface of each annular member to move the same to an exact position on said table, and means for relatively adjusting said gage and table to contact said actuator with the other surface of said master member in the zero position of said indicator whereby said indicator will measure plus or minus deviations from said standard in successive annular members placed on said table and positioned by said camming means.

3. An instrument for measuring deviations in wall thickness of concavo-convex arcuate or annular members from a predetermined standard dimension; comprising a supporting frame, a post rising from said frame, a carriage mounted on said frame to be movable towards or from said post, an electromagnetic gage mounted on said carriage including an actuator, an indicator and zero setting means, a table mounted on said post on which said annular members including a master member may be successively placed to surround the post, camming means mounted on said post for engaging the inner surface of each annular member to move the same to an exact position on said table, and means for adjusting said carriage to contact said actuator with the outer surface of said master member in the zero position of said indicator whereby said indicator will measure plus or minus deviations from said standard in annular members successively placed on said table and positioned by said camming means.

4. An instrument for measuring deviations in wall thickness of concavo-convex arcuate or annular members from a predetermined standard dimension; comprising a supporting frame, a hollow post rising from said frame, a carriage mounted on said frame to be movable towards or from said post, an electromagnetic gage mounted on said carriage including an actuator, an indicator and zero setting means, a table surrounding and vertically adjustably mounted on said post on which table said annular members including a master member may be successively placed to surround the post, a shaft journaled within the hollow post, a radius arm or finger at the upper end of said shaft for engaging the inner surface of each annular member placed on the table to move the same to exact position thereon, and means for adjusting said carriage to contact said actuator with the outer surface of said master member when the latter is placed on the table and positioned by said finger whereupon said indicator may be set at zero and will measure plus or minus deviations from said standard in annular members successively placed on said table and positioned by said finger.

5. An instrument for measuring deviations in wall thickness of concavo-convex arcuate or annular members from a predetermined standard dimension; comprising a supporting frame, a hollow post rising from said frame, a carriage mounted on said frame to be movable towards or from said post and an electromagnetic gage mounted on said carriage including an actuator, an indicator and zero setting means, a table surrounding said post and vertically adjustable thereon on which table said annular members including a master member may be successively placed to surround the post, a rockable shaft journaled within said post, a radius arm or finger projecting from the upper end portion of said shaft to engage the inner surface of each annular member placed on said table and to move the same to an exact position thereon, means for limiting the angular movement of said shaft in one direction including a stop for exactly aligning said finger with said actuator, resilient means for normally holding said shaft and finger at the opposite limit of angular movement, and means for adjusting said carriage to contact said actuator with the outer surface of said master member when placed on said table and positioned by said finger whereupon said indicator may be set to zero and will measure plus or minus deviations from said standard in annular members successively placed on said table and positioned by said finger.

6. An instrument for measuring wall thickness of concavo-convex arcuate members comprising a frame, a support thereon for the member to be measured, an electromagnetic gage including an actuator and an indicator, camming means for engaging one surface of the arcuate member to move the same to a predetermined position on said support, means cooperating with said camming means for centering the arcuate member when positioned on said support so that the center of curvature of said arcuate member is in rectilinear alignment with the axis of movement of said actuator, and means for relatively adjusting said gage and camming means to establish a predetermined dimension therebetween in the zero position of the indicator.

7. An instrument for measuring wall thickness of concavo-convex arcuate members comprising a frame, a support on said frame on which the arcuate members including a master member may be successively placed, an electromagnetic gage including an actuator, an indicator and zero setting means, camming means for engaging one face of an arcuate member to move the same to a predetermined position on said support, means cooperating with said camming means for centering said arcuate member in said predetermined position so that the center of curvature of said arcuate member is in rectilinear alignment with the axis of movement of said actuator, and means for relatively adjusting said gage and camming means to contact said actuator with the opposite surface of said master arcuate member whereupon said indicator may be set at zero so as to measure plus or minus deviations from said master in arcuate members successively tested.

HENRY J. LOOK.

REFERENCES CITED

The following references are of record in the file of this patent:

UNITED STATES PATENTS

| Number | Name | Date |
|---|---|---|
| 1,491,613 | Miller | Apr. 22, 1924 |
| 1,863,673 | Schraven | June 21, 1932 |
| 1,617,284 | Ames | Feb. 8, 1927 |
| 2,240,184 | Hathaway | Apr. 29, 1941 |